United States Patent [19]
Uehara

[11] Patent Number: 4,564,269
[45] Date of Patent: Jan. 14, 1986

[54] PROJECTION LENS
[75] Inventor: Makoto Uehara, Tokyo, Japan
[73] Assignee: Nippon Kogaku K.K., Tokyo, Japan
[21] Appl. No.: 643,436
[22] Filed: Aug. 23, 1984
[30] Foreign Application Priority Data
  Aug. 29, 1983 [JP] Japan .............................. 58-157681
[51] Int. Cl.⁴ ........................... G02B 9/34; G02B 13/18
[52] U.S. Cl. ..................................... 350/432; 350/412; 350/469
[58] Field of Search ................ 350/432, 469, 412, 477
[56] References Cited

U.S. PATENT DOCUMENTS

| | | | |
|---|---|---|---|
| 3,516,734 | 6/1970 | Schmidt | 350/469 X |
| 3,800,085 | 3/1974 | Ambats et al. | 350/420 X |
| 3,868,173 | 2/1975 | Miles et al. | 350/432 X |
| 4,348,081 | 9/1982 | Betensky | 350/412 |

FOREIGN PATENT DOCUMENTS

| | | |
|---|---|---|
| 124114 | 9/1980 | Japan . |
| 108818 | 7/1982 | Japan . |
| 118616 | 7/1983 | Japan . |
| 125007 | 7/1983 | Japan . |

Primary Examiner—John K. Corbin
Assistant Examiner—Scott J. Sugarman
Attorney, Agent, or Firm—Shapiro and Shapiro

[57] ABSTRACT

A projector lens comprises, in succession from the screen side, a first lens of positive refractive power, a second lens of positive refractive power having a biconvex shape, a third lens of negative refractive power in a shape of a meniscus with its highly concave surface facing to the screen side and a fourth lens of negative refractive power having a highly concave surface facing to the screen side.

25 Claims, 11 Drawing Figures

MERIDIONAL ----
SAGITTAL ——

PROJECTION LENS

BACKGROUND OF THE INVENTION

1. Field of the Invention

The present invention relates to a projection lens and more particularly a projection lens for a video projector which projects an image of a CRT (cathde ray tube) on a wide screen.

2. Description of Prior Art

In a common video projector the blue(B), green(G) and red(R) images of a CRT are projected on a screen through the three corresponding lenses. Since the widths of emission spectrum of the three colors are relatively narrow, there is generally no need of an achromatic lens. Various lenses for video projectors are known and used. One of them is of the type which is composed of ordinary spherical lenses only. Another is of the type which includes one or more non-spherical surfaces. With the first-mentioned structure composed of spherical lenses only it is difficult to obtain a bright and wide angle of view. Therefore, the use of it is limited. In order to minimize the number of element lenses while maintaining the desired high performance it is essential for the projector lens to use non-spherical surfaces therein.

Some of the known projection lenses designed employing non-spherical lenses are disclosed in Japanese Patent Application laid open Nos. 124,114/1980, 108,818/1982, 118,616/1983 and 125,007/1983. All of these known projection lenses are composed of three element lenses. As an example, FIG. 1 shows the projection lens disclosed in the above-referred Japanese Patent Application laid open No. 108,818/1982 the assignee of which is the same as that of the present application.

As shown in FIG. 1, the prior art projection lens is composed of three lenses, namely a first lens of positive refractive power, a second biconvex lens of positive refractive power and a third lens of negative refractive power having a highly curved surface facing the screen side. In FIG. 1, the screen is on the left-hand side of the drawing. The original numbers of the respective lenses are from the screen side.

Comparing with the projection lens shown in FIG. 1, the construction of the projection lens disclosed in Japanese Patent Application laid open No. 124,114/1980 is different in that the refractive power of the first lens is weak and that of the second one is strong. Because of this basic form, it has a drawback that the performance of image formation becomes worse at marginal positions although the image-forming performance on axis is good. Another disadvantage of this projection lens is that the focal point varies markedly with the change in temperature of the atmosphere because the three element lenses are all made of plastics. The projection lens as shown in FIG. 1 has also some disavantages. This prior art projection lens has been designed on the assumption that the screen on which an image of a flat CRT is to be projected is a screen curved with the radius of curvature of 2,500 mm and its concave surface facing to the lens side. Therefore, this prior art projection lens has an advantage in view of field curvature. But, the angle of view obtainable by it is narrow, the half view-angle being only 24.05°. Furthermore, in respect of the value of MTF(modulation transfer function) on the CRT side (see FIG. 2), the prior art projection lens is not satisfactory. The value of MTF is about 50% for 5 lines/mm. In addition, also in this projection lens, the three element lenses are all made of plastics which is greatly affected by the change of temperature of the atmosphere as noted above.

The lenses of the prior art projection lens are made of acrylic material. The refractive index $n_e$ of the acrylic lens material to the e-ray varies with changing of temperature as follows:

$n_e(20° C.) = 1.49380$ $n_e(0° C.) = 1.49608$ $n_e(40° C.) = 1.49134$

In the above measurement, the state at 20° C. is considered as the steady state of the material. As the refractive index varies with change of temperature as shown above, the focal point of the projection lens also changes with change of temperature on the side of the CRT. In the case of the projection lens shown in FIG. 1, the magnitude of defocus caused by the variation of refractive index with change of temperature is found from the above data to be as follows (the defocus is zero at 20° C.):

0° C.: −0.635 mm
40° C.: +0.749 mm

This variation of focal point is not small. Judging from the value of MTF shown in FIG. 2 it may be said that the variation is over the practically allowable range if the video projector is located at a place where the temperature changes greatly.

The projector lenses disclosed in the aforementioned Japanese Patent Application laid open Nos. 118,616/1983 and 125,007/1983 are of the same construction as that shown in FIG. 1. But, in these prior art projector lenses, the second lens is made of glass to reduce the variation of focal point with the change of temperature. However, they have still some disadvantages. Since the second lens is made of glass and is not non-spherical, the spherical aberration is not corrected well. The angle of view is narrow. The half view-angle is smaller than 25°. The field curvature is unsatisfactorily corrected. Even in respect of focus variation by the change of temperature, that in the first lens remains uncompensated at all. As a whole, therefore, the effect on the reduction of focal variation is not satisfactory.

SUMMARY OF THE INVENTION

Accordingly, it is the general object of the invention to overcome the drawbacks of the prior art projector lenses as mentioned above.

A more specific object of the invention is to provide a projector lens for a video projector which can offer a wider angle of view and adequately high performance of image formation.

Another object of the invention is to provide such a projector lens for a video projector which is well compensated to the focus variation as caused by the temperature change of the atmosphere surrounding the projector.

To attain the above objects the present invention provides a projector lens comprising, in succession from the screen side, a first lens of positive refractive power, a second lens of positive refractive power having a biconvex shape, a third lens of negative refractive power in a shape of a meniscus with its highly concave surface facing to the screen side and a fourth lens of negative refractive power having a highly concave surface facing to the screen side.

In the basic form according to the invention, the first lens performs the function to correct both of spherical aberration and coma. The second and third lenses are arranged close to each other so as to form, in substance, a so-called separate doublet which performs the function to further correct the remaining spherical aberration and coma left still uncorrected after the correction by the first lens. The fourth lens functions as a field flattener and corrects Petzval sum, that is, field curvature and astigmatism.

In order to have the element lenses fully perform the respective functions for the correction of aberrations it is desirable that each one surface of, at least, the first, third and fourth lenses be formed as a non-spherical surface. For practicality these lenses each having a non-spherical surface are preferably made of plastics which enables realization of a substantial cost reduction. On the other side, the projection lens according to the present invention should have the function to compensate the above-described variation of focal point with the change of temperature. To attain the object it is absolutely necessary for the second lens to be made of glass while the first, third and fourth lenses may be made of plastics. As previously noted, the refractive index of plastics varies greatly depending on temperature. The degree of dependence on temperature is about two figures larger than that of glass. By making the second lens from glass, the focus variation attributable to the second lens becomes practically negligibly small. Also, the focus variation attributable to the fourth lens is negligibly small because it is located near the object plane. Therefore, among four element lenses, two lenses, namely the second lens and the fourth lens take practically no part in focus variation by temperature change on the total system. The lenses to be considered with regard to the problem of focus variation are only the remaining two lenses, namely the first lens and the third lens.

As to the first and third lenses it has been found that the focus variation attributable to these two lenses can be reduced to a great extent when they are designed to satisfy the following condition:

$$-3.0 \leq P_1/P_3 \leq -0.8$$

wherein, $P_1$ is the refractive power of the first lens and $P_3$ is the refractive power of the third lens.

Consequently, for the reason described above, sufficient compensation to temperature change can be attained on the total system by satisfying the above condition.

The effect for temperature-compensation decreases when the value of $P_1/P_3$ is below the lower limit of the above condition. On the contrary, when the value is over the upper limit, the temperature-compensating effect increases. As the value approaches the upper limit of the condition, the refractive power of the third lens becomes larger and, therefore, the refractive power of the second lens also becomes larger accordingly. This intensifies, at the same time, the aberration-correcting effect of the two lenses as a separate doublet. However, if the value is over the upper limit, then the refractive power of the second lens becomes too strong. Thereby there is produced a new problem that too much aberration is generated at the surface of the second lens facing to the screen side. When the value approaches the lower limit of the condition, the aberration-correcting effect of the second and third lenses as a separate doublet, decreases gradually. If the value is below the lower limit, the effect is almost lost. As will be understood from the above, it is essential also in view of the correction of aberration that the first and second lenses be made of plastics within the above-shown condition and the second lens be made of glass.

In order to completely attain the object for the compensation of temperature change it is most preferable that the first lens ($L_1$) be made of acryl and the third lens ($L_3$) be made of styrene. But, sufficient effect for the compensation of temperature in the projection lens for a video projector can be obtained even when acryl is used for the third lens ($L_3$). The thing essential for obtaining an adequate effect for the compensation of temperature is that as the lens material for the first and third lenses one uses plastic and as the lens material for the second lens one uses glass and that the refractive powers of the first and third lenses be selected within the range of power ratio given by the above conditional formula.

For the construction of the projection lens according to the invention as defined above, it is desirable to satisfy further the following condition:

$$|r_4| > |r_5|$$

wherein, $r_4$ is the radius of curvature of the lens surface of the second lens ($L_2$) facing to the CRT side and $r_5$ is the radius of curvature of the lens surface of the negative meniscus lens, namely the third lens facing to the screen side.

When the above condition is satisfied, there is formed between the second lens having a biconvex shape and the third lens an air gap in the shape of a meniscus with the concave surface facing to the screen side. The air gap assures a better correction of aberration. Not only spherical aberration but also coma can be corrected better throughout the overall angle of view. Further it is desirable that the air gap between the second and third lenses $L_2$ and $L_3$ be smaller than the axial width of the third lens $L_3$.

Other and further objects, features and advantages of the present invention will appear more fully from reading the following description of preferred embodiments taken in connection with the accompanying drawings.

DESCRIPTION OF PREFERRED EMBODIMENTS

Figure 1:
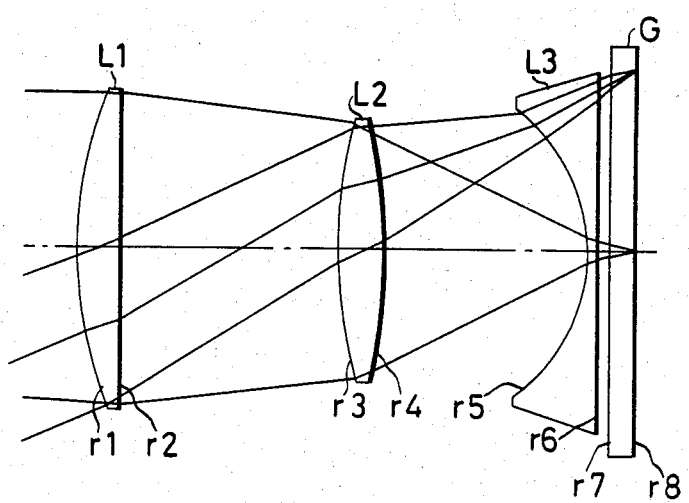
FIG. 1 is a schematic view showing the arrangement and construction of lenses in a prior art projection lens.
Figure 2:
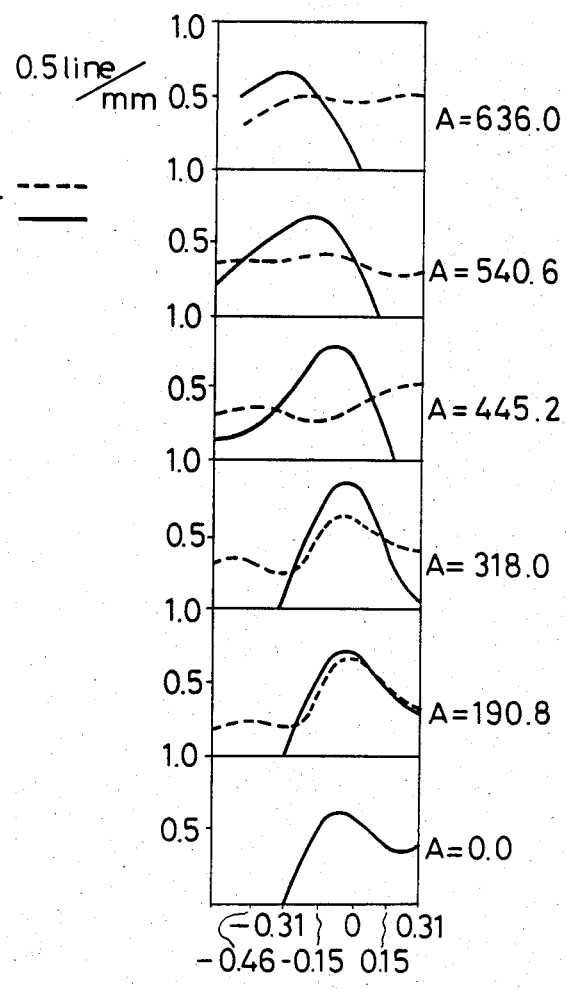
FIG. 2 shows MTF characteristic curves of the prior art projection lens.
Figure 3:
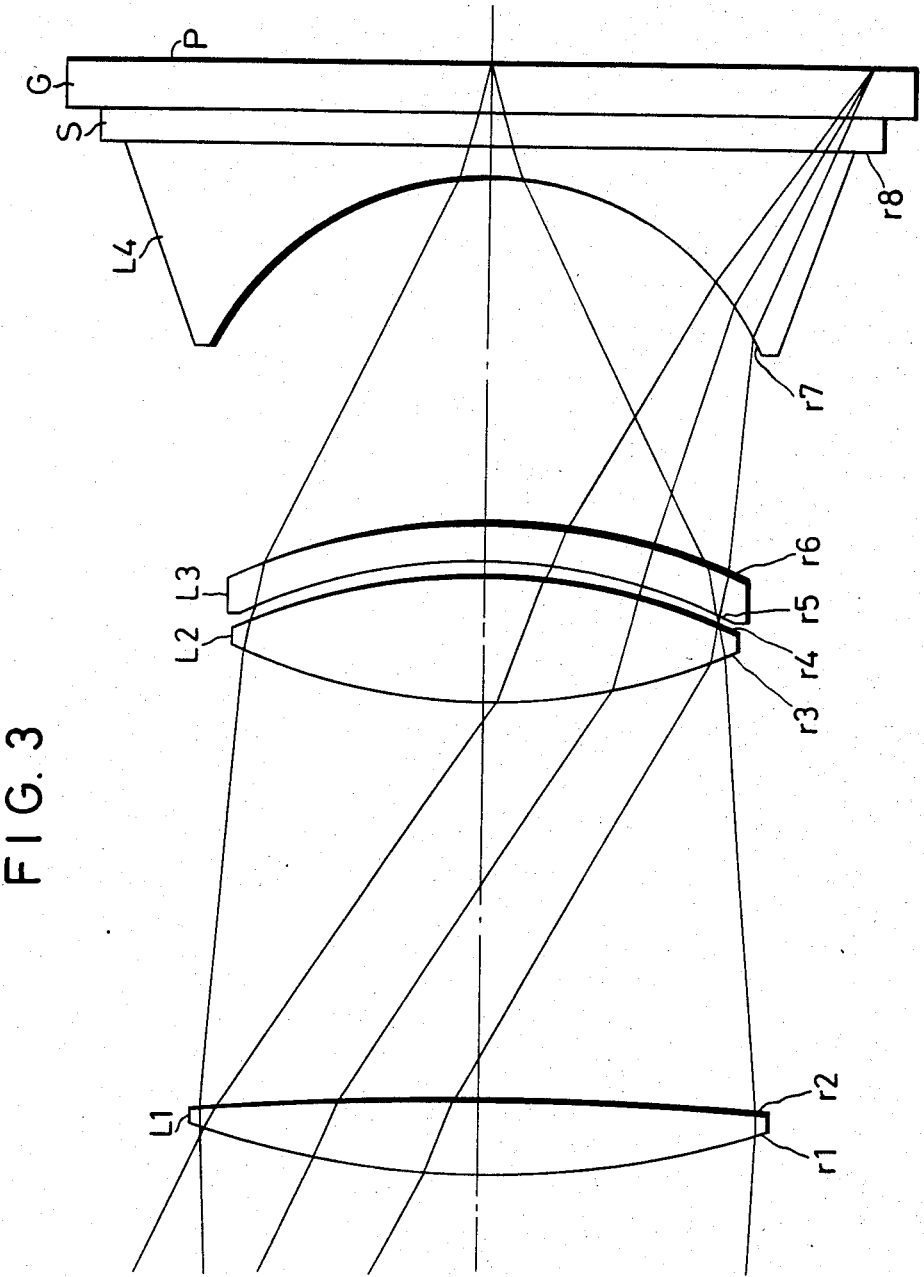
FIG. 3 is a schematic view showing the arrangement and construction of lenses in a first embodiment of the invention.

A first embodiment of the invention is schematically shown in FIG. 3. For the sake of illustration, the light paths of a bundle of rays at the center and of that at image height 100% are shown in FIG. 3.

In this embodiment, the projection lens comprises four lenses $L_1$, $L_2$, $L_3$ and $L_4$. In this example and also in the following examples the ordinals of lenses are numbered starting from the screen side. The first lens $L_1$ has a positive refractive power. The second lens $L_2$ has a positive refractive power and is in a biconvex shape. The third lens $L_3$ has a negative refractive power and is in a shape of a meniscus with its concave surface facing to the screen side. The fourth lens $L_4$ has a negative power and has a highly curved concave surface facing to the screen side. Behind the fourth lens there are disposed further a silicone rubber plate S, a CRT front glass G and a fluorescent surface P. The silicone rubber S is provided for the connection of the lens and the CRT front surface and can optically be considered as a parallel plane plate substantially. The CRT front glass G is also a parallel plane in substance. Through the front glass there is disposed the fluorescent surface as the object plane of the system.

As seen in FIG. 3, the surface of the first lens $L_1$ facing to the screen side, namely the lens surface $r_1$ is shaped into a non-spherical surface. Also, the surface of the fourth lens $L_4$ facing to the screen side, namely the lens surface $r_7$ and the surface of the third lens $L_3$ facing to the CRT side, namely the lens surface $r_6$ are non-spherical. The first, third and fourth lenses having the non-spherical surface are all made of plastics. More particularly, the lens materials for the first and fourth lenses $L_1$ and $L_4$ are acryl and that for the third lens $L_3$ is styrene. Only the second lens $L_2$ is made of glass.

The respective functions of the lenses $L_1$–$L_4$ can easily be understood from the light paths of the beam shown in FIG. 3.

The beam reaching the center of the object plane (CRT surface) is spherical aberration-corrected at first by the non-spherical surface of the first lens $L_1$. Then, the remaining spherical aberration is further corrected by the separate doublet constituted of the second and third lenses $L_2$ and $L_3$. Thus, a conjugate relation between the center of the object plane and the center of the screen is held. Regarding the oblique beam toward the marginal portion of the object plane, the part of it above the principal ray as viewed in FIG. 3 is corrected by the non-spherical surface of the first lens $L_1$. The part under the principal ray is corrected by the separate doublet ($L_2$ and $L_3$) and also by the non-spherical surface of the third lens $L_3$.

As seen from the above, the separate doublet functions intensively to correct the spherical aberration. Because of it the non-spherical surfaces of the first and third lenses $L_1$ and $L_3$ can intensely function to correct the coma throughout a wide angle of view. If the second lens $L_2$ and the third lens $L_3$ were united together into a spherical lens, the spherical aberration would be insufficiently corrected and the correction of coma throughut a wide angle of view would be impossible. As another assumption, if the second lens $L_2$ and the third lens $L_3$ were united together into a lens provided with a non-spherical surface, only the spherical aberration would be corrected by it. It would be unable to cope with a wide angle of view. Therefore, there would be obtained a projection lens having a lower MTF value and poor performance of image formation as a whole.

The data of elements of the first embodiment are shown in the following table, Example 1.

In the table the meanings of the characters are as follows:

$r_1$, $r_2$, $r_3$ ... are the curvature radii of the respective lens surfaces, the ordinal being numbered from the screen side;

$d_1$, $d_2$, $d_3$ ... are the center-thicknesses and lens-to-lens distances of the respective lenses;

$n_1$, $n_2$, $n_3$ ... are the refractive indexes to the e-ray at 20° C. of the respective lenses;

$f_1$, $f_2$, $f_3$ and $f_4$ are the focal lengths of the respective lenses; and f is the focal length of the total system.

The shape of the non-spherical surfaces of the lenses is a rotation symmetrical non-spherical surface as represented by the following formula on rectangular coordinates with the X-axis extending in the direction of the optical axis:

$$X = \frac{CP}{1 + \sqrt{1 - KC^2P^2}} + C_2P^2 + C_4P^4 + C_6P^6 + C_8P^8 + C_{10}P^{10}$$

$$P = \sqrt{Y^2 + Z^2}$$

wherein
C is apex curvature;
K is circular cone constant; and
$C_2$, $C_4$, $C_6$, $C_8$ and $C_{10}$ are higher order constants.

Values of these non-spherical factors are also given in the following table. (The above definitions of characters and non-spherical factors are applied also to the following examples).

EXAMPLE 1

| | | |
|---|---|---|
| f = 101.2 | Aperture ratio: | 1:1.10 |
| Magnification of projection: | | $-7.997^x$ |
| Half angle of view: | | 28.56° |
| $r_1 = 143.454$ | $d_1 = 11.0$ | $n_1 = 1.49380$   $L_1$ |
| $r_2 = -1542.254$ | $d_2 = 68$ | |
| $r_3 = 116.976$ | $d_3 = 20.0$ | $n_2 = 1.62286$   $L_2$ |
| $r_4 = 110.914$ | $d_4 = 2.87$ | |
| $r_5 = -89.375$ | $d_5 = 5.0$ | $n_3 = 1.59501$   $L_3$ |
| $r_6 = -127.071$ | $d_6 = 58.8$ | |
| $r_7 = -48.609$ | $d_7 = 5$ | $n_4 = 1.49380$   $L_4$ |
| $r_8 = \infty$ | | |
| $r_9 = \infty$ | $d_8 = 5$ | $n_5 = 1.45000$   S |
| $r_{10} = \infty$ | $d_9 = 8$ | $n_6 = 1.51872$   G |

| $r_1$ ($L_1$) | $r_6$ ($L_3$) | $r_7$ ($L_4$) |
|---|---|---|
| K = 1.0 | K = 1.0 | K = 0.0 |
| $C_2 = 0$ | $C_2 = 0$ | $C_2 = 0$ |
| $C_4 = -0.25396 \times 10^{-6}$ | $C_4 = -0.15389 \times 10^{-8}$ | $C_4 = -0.16950 \times 10^{-5}$ |
| $C_6 = +0.22757 \times 10^{-12}$ | $C_6 = -0.25521 \times 10^{-10}$ | $C_6 = -0.40698 \times 10^{-9}$ |
| $C_8 = -0.21205 \times 10^{-14}$ | $C_8 = +0.92353 \times 10^{-14}$ | $C_8 = +0.31136 \times 10^{-12}$ |

-continued

| $r_1$ (L$_1$) | $r_6$ (L$_3$) | $r_7$ (L$_4$) |
|---|---|---|
| $C_{10} = -0.90440 \times 10^{-18}$ | $C_{10} = -0.60222 \times 10^{-17}$ | $C_{10} = -0.46400 \times 10^{-16}$ |

$f_1 = 266.4$
$f_2 = 94.6$
$f_3 = -532.7$
$f_4 = -98.438$

Figure 4A:
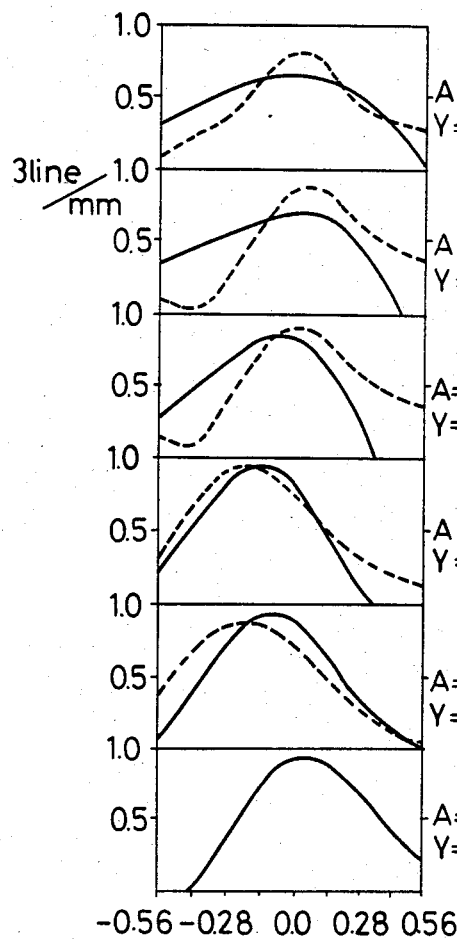
FIGS. 4(A) and 4(B) are MTF characteristic curves of the first embodiment.
Figure 4B:
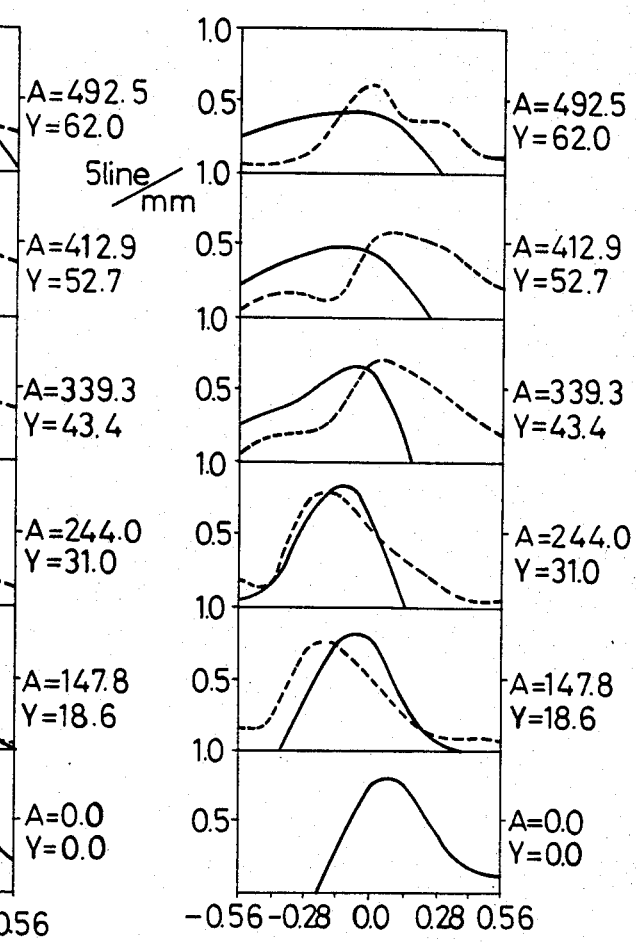

The image-forming performance of the projection lens of the above first embodiment is illustrated by the MTF characteristic curves in FIGS. 4(A) and 4(B). FIG. 4(A) shows the MTF characteristic curves for 3 lines/mm on CRT and FIG. 4(B) shows those for 5 lines/mm. Wavelength is of the e-ray spectrum and the curves are of rectangular wave MTF at image height 100%, 85%, 70%, 50%, 30% and at center respectively as viewed from the top of the figure. Solid line curves are MTF-characteristics in meridional direction and broken-line curves are those in sagittal direction. A is height on screen and Y is height on CRT. The amount of defocus on CRT is on the axis of abscissa. As seen from FIGS. 4(A) and (B), the value of MTF is substantially over 50% even for 5 lines/mm. It is evident that the projection lens of the first embodiment has a wider angle of view than the prior art ones and is a projection lens for a video projector better balanced from center to marginal.

The temperature-compensating function of the first embodiment will hereinafter be described.

Measuring the refractive indexes to the e-ray of acryl and styrene while changing the temperature within the range of from 0° C. to 40° C. relative to 20° C. as stationary state, the following data have been obtained:

| Acryl | Styrene |
|---|---|
| $n_e(20°) = 1.49380$ | $n_e(20°) = 1.59501$ |
| $n_e(0°) = 1.49608$ | $n_e(0°) = 1.59746$ |
| $n_e(40°) = 1.49134$ | $n_e(40°) = 1.59236$ |

Compared with the above plastic materials, glass is very stable in refractive index against the change of temperature. The change of refractive index of glass caused by temperature change is about two Figures smaller than that of the above material. The silicone rubber used in the first embodiment has also a very small effect on the defocus of the total system because it is used as a parallel plane plate. Therefore, the variation of refractive index with temperature in both of glass and silicone rubber is practically negligible.

The amount of defocus of the above first embodiment (Example 1) caused by the change of temperature on the CRT side was measured providing that defocus is zero at 20° C. The measured values are shown below.

| | Example 1 |
|---|---|
| 0° C. | −0.164 mm |
| 40° C. | +0.180 mm |

When these values are compared with the amount of defocus of the prior art projection lens as disclosed in the aforementioned Japanese Patent Application laid open No. 108,818/1982 measured under the same condition, it is found that the amount of defocus of the first embodiment of the invention is only one fourth of that of the prior art one. Further, compare the above values of defocus with the values of defocus of MTF characteristic curves in FIGS. 4(A) and (B). Then one can understand that in the case of 3 lines/mm, the measured amount of defocus is fairly within the depth of focus and even in the case of 5 lines/mm about 10% of MTF value can be maintained.

From the above it is evident that the defocus attributable to temperature change can be minimized by the construction of the present invention and that the projection lens according to the present invention can maintain its practically excellent image-forming performance even when the atmospheric temperature varies greatly.

Figure 5:
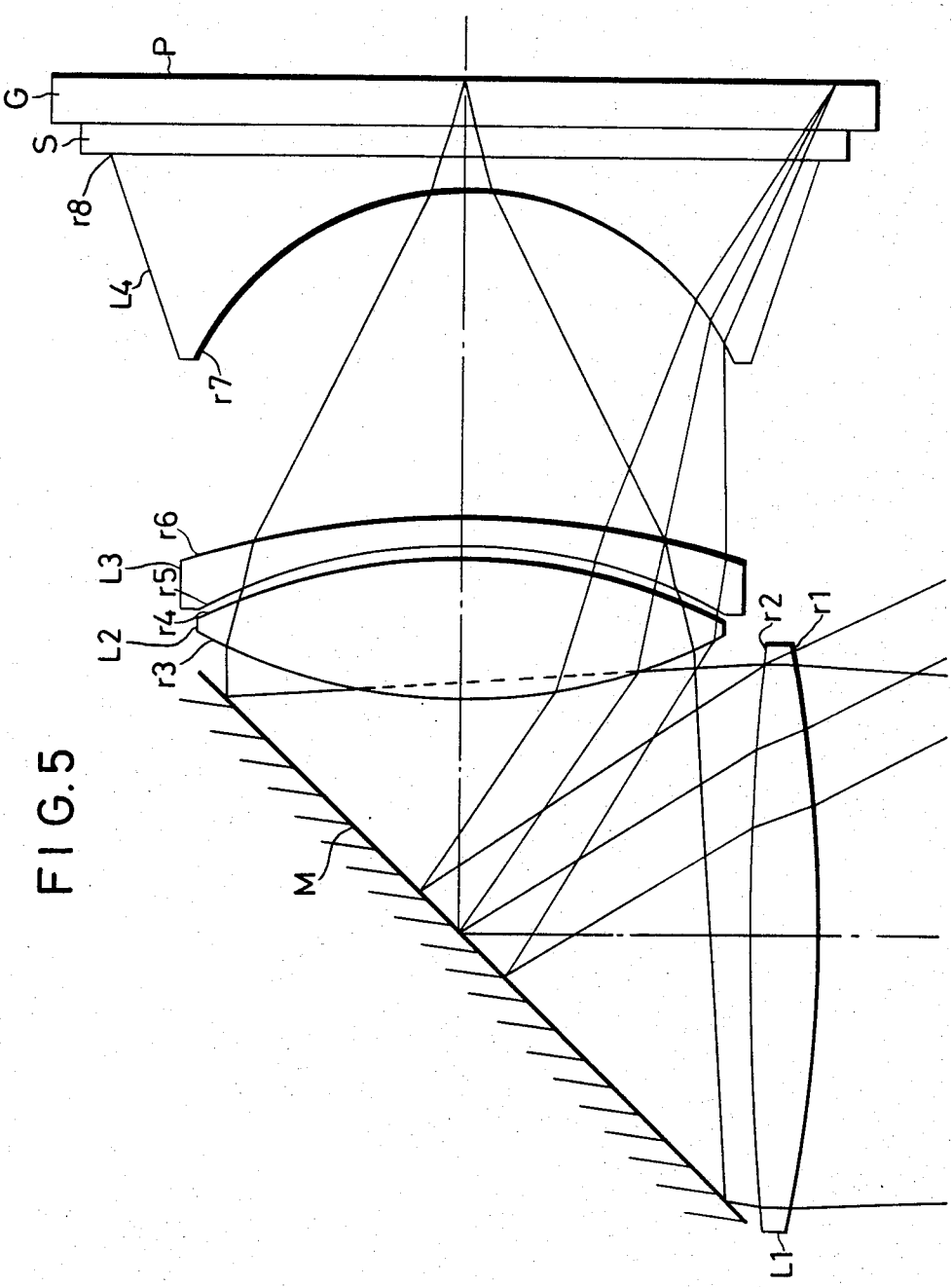
FIG. 5 is a schematic view showing a second embodiment of the invention.
Figure 7:
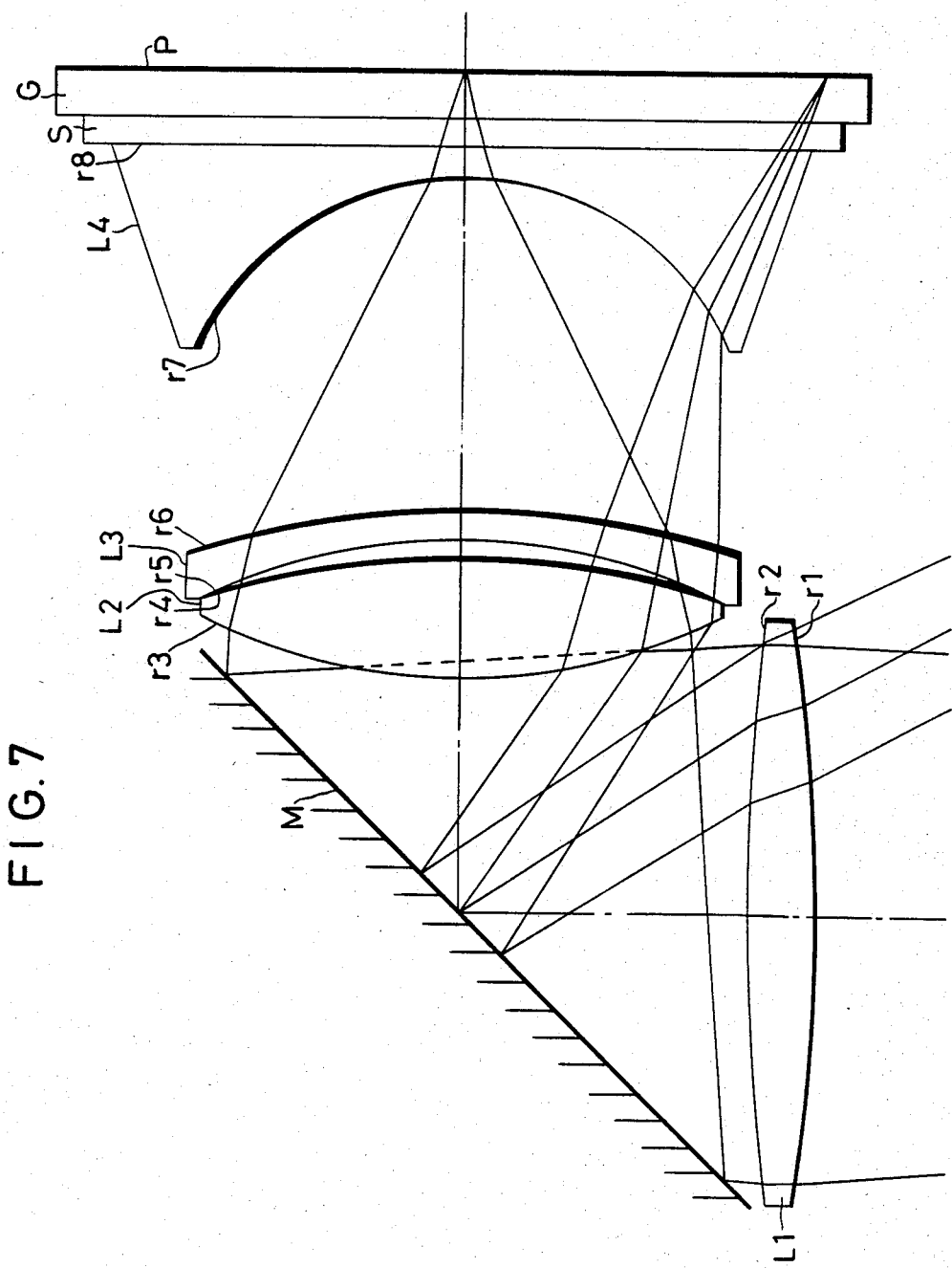
FIG. 7 is a schematic view showing a third embodiment of the invention.

FIG. 5 and FIG. 7 show the second and third embodiments of the invention.

Again, in these figures, light paths of beams at center and at image height 100% are shown to illustrate the functions of the lenses.

In these second and third embodiments, the projection lens comprises a first lens of positive refractive power ($L_1$), a plane mirror (M), a biconvex second lens of positive refractive power ($L_2$), a third lens of negative refractive power having a shape of a meniscus with its concave surface facing to the screen side ($L_3$) and a fourth lens of negative refractive power with its highly concave surface facing to the screen side ($L_4$). Behind the fourth lens there are a plate of silicone rubber (S), a CRT front glass (G) and a fluorescent surface (P) as the object plane. The silicone rubber plate (S) is optically considered as a parallel plane plate. It is provided to connect the lens to the CRT front surface. The CRT front glass through which the fluorescent surface (P) is disposed, is also a parallel plane in substance. Materials of the four lenses $L_1$-$L_4$ as well as designs for the lenses including non-spherical surfaces correspond to those of the above first embodiment. Consequently they need not be further described. In contrast to the first embodiment, the second and third embodiments are featured by the provision of the plane mirror (M) about 45° obliquely disposed between the first lens ($L_1$) and the second lens ($L_2$). As the mirror is provided in the projection lens, the screen surface as the image plane of the system and the CRT surface (P) as the object plane are arranged substantially perpendicularly to each other. By this arrangement a compact video projector can be realized.

Data of the elements of the above second and third embodiments are shown in the following tables, Example 2 and Example 3.

EXAMPLE 2

| f = 103.9 | Aperture ratio: | 1:1.11 | |
|---|---|---|---|
| Magnification of projection: | | −7.932$^x$ | |
| Half angle of view: | | 27.1° | |
| $r_1 = 223.029$ | $d_1 = 11.0$ | $n_1 = 1.49380$ | $L_1$ |
| $r_2 = -491.036$ | $d_2 = 90.0$ | | |
| $r_3 = 93.718$ | $d_3 = 24.0$ | $n_2 = 1.62286$ | $L_2$ |
| $r_4 = -110.115$ | $d_4 = 3.0$ | | |
| $r_5 = -87.097$ | $d_5 = 5.0$ | $n_3 = 1.59501$ | $L_3$ |
| $r_6 = -144.756$ | $d_6 = 56.0$ | | |
| $r_7 = -48.366$ | $d_7 = 5.0$ | $n_4 = 1.49380$ | $L_4$ |

-continued

| | | |
|---|---|---|
| $r_8 = \infty$ | | |
| $r_9 = \infty$ | $d_8 = 5.0$ | $n_5 = 1.45000$ S |
| $r_{10} = \infty$ | $d_9 = 8.0$ | $n_6 = 1.51872$ G |

| $r_1$ (L$_1$) | $r_6$ (L$_3$) | $r_7$ (L$_4$) |
|---|---|---|
| $K = 1.0$ | $K = 1.0$ | $K = 0.0$ |
| $C_2 = 0$ | $C_2 = 0$ | $C_2 = 0$ |
| $C_4 = -0.14167 \times 10^{-6}$ | $C_4 = +0.16171 \times 10^{-6}$ | $C_4 = -0.22800 \times 10^{-5}$ |
| $C_6 = -0.22352 \times 10^{-10}$ | $C_6 = -0.17475 \times 10^{-9}$ | $C_6 = +0.19485 \times 10^{-9}$ |
| $C_8 = +0.97419 \times 10^{-14}$ | $C_8 = +0.59843 \times 10^{-13}$ | $C_8 = -0.65121 \times 10^{-13}$ |
| $C_{10} = -0.19587 \times 10^{-17}$ | $C_{10} = -0.13108 \times 10^{-16}$ | $C_{10} = +0.12473 \times 10^{-16}$ |

$f_1 = 312.2$
$f_2 = 85.1$
$f_3 = -379.8$
$f_4 = -97.9$

EXAMPLE 3

| | | | |
|---|---|---|---|
| $f = 103.5$ | Aperture ratio: | 1:1.12 | |
| | Magnification of projection: | $-7.952^x$ | |
| | Half angle of view: | 28.4° | |
| $r_1 = 258.591$ | $d_1 = 11.0$ | $n_1 = 1.49380$ | L$_1$ |
| $r_2 = -383.684$ | $d_2 = 90.0$ | | |
| $r_3 = 97.238$ | $d_3 = 22.0$ | $n_2 = 1.62286$ | L$_2$ |
| $r_4 = -114.795$ | $d_4 = 3.0$ | | |
| $r_5 = -88.542$ | $d_5 = 5.0$ | $n_3 = 1.59048$ | L$_3$ |
| $r_6 = -130.879$ | $d_6 = 57.5$ | | |
| $r_7 = -49.159$ | $d_7 = 5.0$ | $n_4 = 1.49380$ | L$_4$ |
| $r_8 = \infty$ | | | |
| $r_9 = \infty$ | $d_8 = 5.0$ | $n_5 = 1.45000$ | S |
| $r_{10} = \infty$ | $d_9 = 0 8.0$ | $n_6 = 1.51872$ | G |

| $r_1$ (L$_1$) | $r_6$ (L$_3$) | $r_7$ (L$_4$) |
|---|---|---|
| $K = 1.0$ | $K = 1.0$ | $K = 0.0$ |
| $C_2 = 0.0$ | $C_2 = 0.0$ | $C_2 = 0.0$ |
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1 = 314.6$
$f_2 = 88.0$
$f_3 = -481.2$
$f_4 = -99.6$

Figure 6A:
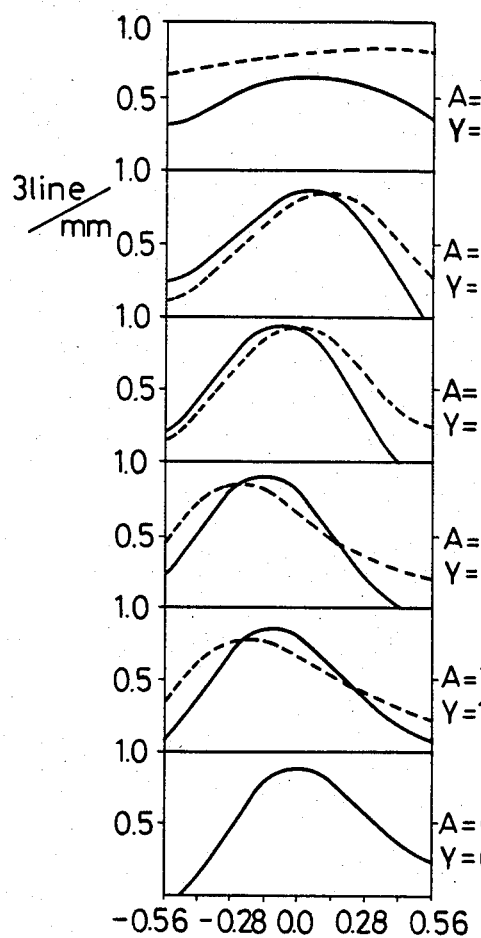
FIGS. 6(A) and 6(B) are MTF characteristic curves of the second embodiment.
Figure 6B:
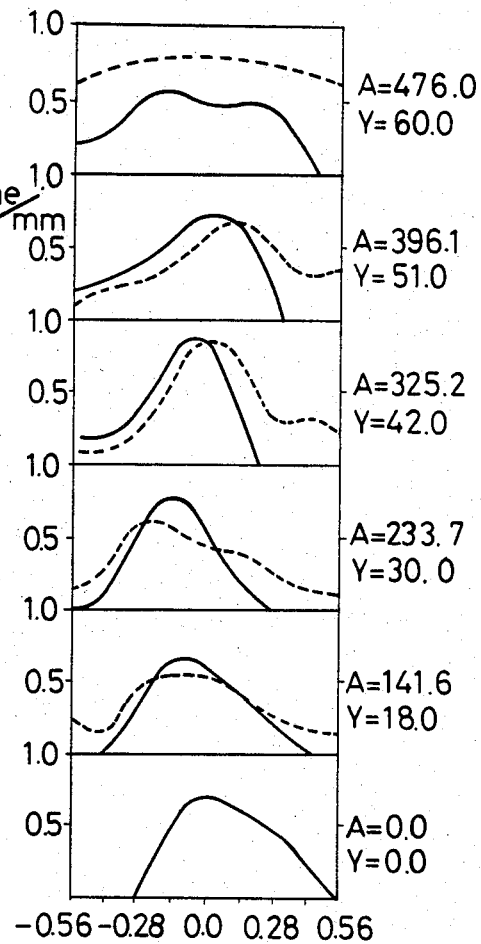
Figure 8A:
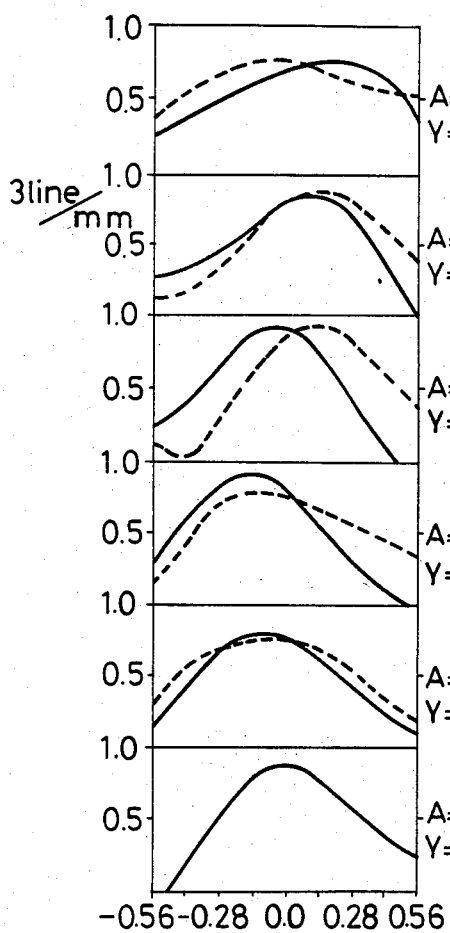
FIGS. 8(A) and 8(B) are MTF characteristic curves of the third embodiment.
Figure 8B:
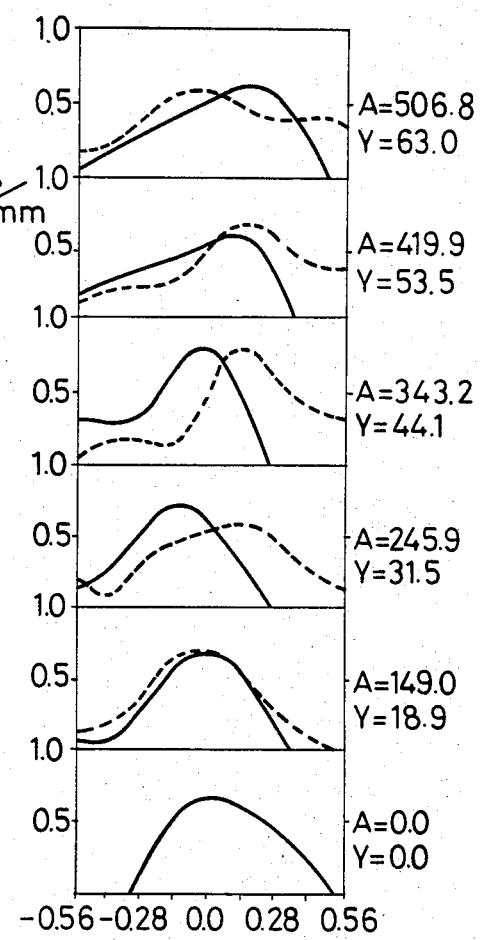

The image-forming performance of the second embodiment is illustrated by MTF characteristic curves in FIGS. 6(A) and (B), and that of the third embodiment by MTF characteristic curves in FIGS. 8(A) and (B) in the same manner as described above in connection to the first embodiment.

The temperature-compensating effect of the second and third embodiments is illustrated by the following table showing the amounts of defocus on the CRT side at 0° C. and 40° C. measured providing that defocus is zero at 20° C.:

| | Example 2 | Example 3 |
|---|---|---|
| 0° C. | −0.118 mm | −0.118 mm |
| 40° C. | +0.129 mm | +0.127 mm |

These data demonstrate that like the first embodiment the second and third embodiments are also superior than the prior art projection lens in image-forming performance and temperature-compensating function.

While the present invention has been particularly shown and described with reference to preferred embodiments thereof, it is to be understood that many modifications and changes may be made in the above embodiments. For example, in the shown embodiments, non-spherical surfaces have been formed on the surface ($r_1$) of the first lens (L$_1$) facing to the screen side, on the surface ($r_6$) of the third lens (L$_3$) facing to the CRT side and on the surface ($r_7$) of the fourth lens (L$_4$) facing to the screen side. But, the first and third lenses may be formed to have the same non-spherical surface on the other side. In this modification the same performance as the above embodiment can be obtained. The material to be used to connect the projection lens and CRT front surface is not limited to silicone rubber as shown in the above embodiments. For the same purpose there may be used also liquid such as water, alcohol or the like. It may be even an air layer. Also, the CRT front glass may be made differently from the above embodiments in respect to material and thickness.

As readily understood from the foregoing, the projection lens for a video projector according to the present invention has many advantages over the prior art ones. It is a bright lens having an aperture ratio in the range of from 1:1.0 to 1:1.2. It has a wide angle of view. The half angle of view of it is 25° to 30°. It has very excellent performance in image formation for such a wide angle of view. The projection lens is well and adequately compensated to the variation of focal point with the change of atmospheric temperature in the range of 0° C. to 40° C.

In a projection lens having a wide angle of view as in the case of the projector lens according to the invention, the lens which has the largest outer-diameter of the four lenses is the fourth lens (L$_4$). The fourth lens is disposed nearest to the CRT. The shape of the CRT commonly used is rectangular. Therefore, when the fourth lens is shaped into a rectangular or square form a little larger than the effective size of the CRT and analogous to the shape of the CRT, a substantial reduction of manufacturing cost and a further compact construction of the lens can be attained. In addition, the performance of the video projector can be improved by it. This is applicable particularly to the transmission type video projector. In this type of projector lens, some limitations are imposed on the optical arrangement of the CRT and projection lens. Generally, the CRT for green (G) and the projection lens associated with it are allowed to select the optical axis perpendicular to the screen as the image plane. But, the projection lenses associated with other two CRTs for blue (B) and red (R) are required to have a small angle of tilt. On the other hand, it is wished to arrange the three optical systems including the associated CRTs for blue, green and red near to each other as closely as possible and to minimize the angle of tilt as much as possible. To satisfy the requirement the size of the fourth lens ($L_4$) which is the largest one of the four lenses must be reduced to a size substantially equal to that of the CRT. In view of the image-forming performance of the projection lens, the first, second and third lenses ($L_1$, $L_2$, and $L_3$) are desired to be circular and have apertures as large as possible. The fourth lens ($L_4$) can be changed in shape and size without changing the performance of the projection. Therefore, it is allowed to design the fourth lens as a rectangular lens provided that the size of the fourth lens is a little larger than that of the CRT. By making the fourth lens have a rectangular external shape a little larger than that of the associated CRT, therefore, it is possible to arrange three CRTs closely to each other and to minimize the required angle of tilt. Consequently, the quality of images projected on the screen can be improved and a further reduction of the overall size of the total apparatus can be realized.

I claim:

1. A projection lens for a projector which projects an image on a screen, said projection lens consisting essentially of, in succession from the screen side,
   a first lens of a positive refractive power;
   a second lens of a positive refractive power having a biconvex shape;
   a third lens of a negative refractive power having a concave surface facing to the screen side and being of the meniscus type; and
   a fourth lens of a negative refractive power having a concave surface facing to the screen side.

2. A projection lens according to claim 1, wherein said projection lens satisfies the following condition:

$$-3.0 \leq P_1/P_3 \leq -0.8$$

where $P_1$ and $P_3$ are the refractive powers of said first and third lenses.

3. A projection lens according to claim 1, wherein said projection lens satisfies the following condition:

$$|r_4| > |r_5|$$

where
   $r_4$ is the radius of curvature of the CRT side lens surface of said second lens, and
   $r_5$ is the radius of curvature of the screen side lens surface of said third lens.

4. A projection lens according to claim 1, wherein said first, third and fourth lenses are formed of plastics whereas said second lens is formed of glass.

5. A projection lens according to claim 4, wherein said first, third and fourth lenses have non-spherical surfaces and said second lens is a spherical lens.

6. A projection lens according to claim 5, wherein the air-distance between said second and third lenses is smaller than the center thickness of said third lens.

7. A projection lens according to claim 6, as represented by the following data:

| $f = 101.2$ | Aperture ratio: | 1:1.10 | |
|---|---|---|---|
| | Magnification of projection: | $-7.997^x$ | |
| | Half angle of view: | $28.56°$ | |
| $r_1 = 143.454$ | $d_1 = 11.0$ | $n_1 = 1.49380$ | $L_1$ |
| $r_2 = -1542.254$ | $d_2 = 68$ | | |
| $r_3 = 116.976$ | $d_3 = 20.0$ | $n_2 = 1.62286$ | $L_2$ |
| $r_4 = 110.914$ | $d_4 = 2.87$ | | |
| $r_5 = -89.375$ | $d_5 = 5.0$ | $n_3 = 1.59501$ | $L_3$ |
| $r_6 = -127.071$ | $d_6 = 58.8$ | | |
| $r_7 = -48.609$ | $d_7 = 5$ | $n_4 = 1.49380$ | $L_4$ |
| $r_8 = \infty$ | | | |
| $r_9 = \infty$ | $d_8 = 5$ | $n_5 = 1.45000$ | S |
| $r_{10} = \infty$ | $d_9 = 8$ | $n_6 = 1.51872$ | G |

| $r_1$ ($L_1$) | $r_6$ ($L_3$) | $r_7$ ($L_4$) |
|---|---|---|
| $K = 1.0$ | $K = 1.0$ | $K = 0.0$ |
| $C_2 = 0$ | $C_2 = 0$ | $C_2 = 0$ |
| $C_4 = -0.25396 \times 10^{-6}$ | $C_4 = -0.15389 \times 10^{-8}$ | $C_4 = -0.16950 \times 10^{-5}$ |
| $C_6 = +0.22757 \times 10^{-12}$ | $C_6 = -0.25521 \times 10^{-10}$ | $C_6 = -0.40698 \times 10^{-9}$ |
| $C_8 = -0.21205 \times 10^{-14}$ | $C_8 = +0.92353 \times 10^{-14}$ | $C_8 = +0.31136 \times 10^{-12}$ |
| $C_{10} = -0.90440 \times 10^{-18}$ | $C_{10} = -0.60222 \times 10^{-17}$ | $C_{10} = -0.46400 \times 10^{-16}$ |

$f_1 = 266.4$
$f_2 = 94.6$
$f_3 = -532.7$
$f_4 = -98.438$ where,
   $r_1$, $r_2$, $r_3$ ... are radii of curvature of the lens surfaces numbered in succession from the screen side;
   $d_1$, $d_2$, $d_3$ ... are center-thicknesses and lens-to-lens distances of the first lens ($L_1$), second lens ($L_2$), third lens ($L_3$) and fourth lens ($L_4$);
   $n_1$, $n_2$, $n_3$ ... are the refractive indexes to e-ray at 20° C. of the respective lenses;
   $f_1$, $f_2$, $f_3$ and $f_4$ are the focal lengths of the respective lenses;
   f is the focal length of the total system;
   C is apex curvature;
   K is a circular cone constant of the non-spherical surfaces; and
   $C_2$, $C_4$, $C_6$, $C_8$ and $C_{10}$ are higher order constants of the non-spherical surface.

8. A projection lens according to claim 6 as represented by the following data:

| $f = 103.9$ | Aperture ratio: | 1:1.11 | |
|---|---|---|---|
| | Magnification of projection: | $-7.932^x$ | |
| | Half angle of view: | $27.1°$ | |
| $r_1 = 223.029$ | $d_1 = 11.0$ | $n_1 = 1.49380$ | $L_1$ |
| $r_2 = -491.036$ | $d_2 = 90.0$ | | |
| $r_3 = 93.718$ | $d_3 = 24.0$ | $n_2 = 1.62286$ | $L_2$ |
| $r_4 = -110.115$ | $d_4 = 3.0$ | | |
| $r_5 = -87.097$ | $d_5 = 5.0$ | $n_3 = 1.59501$ | $L_3$ |
| $r_6 = -144.756$ | $d_6 = 56.0$ | | |
| $r_7 = -48.366$ | $d_7 = 5.0$ | $n_4 = 1.49380$ | $L_4$ |
| $r_8 = \infty$ | | | |

-continued

| | | | |
|---|---|---|---|
| $r_9 = \infty$ | $d_8 = 5.0$ | $n_5 = 1.45000$ | S |
| $r_{10} = \infty$ | $d_9 = 8.0$ | $n_6 = 1.51872$ | G |

| $r_1$ (L$_1$) | $r_6$ (L$_3$) | $r_7$ (L$_4$) |
|---|---|---|
| K = 1.0 | K = 1.0 | K = 0.0 |
| $C_2 = 0$ | $C_2 = 0$ | $C_2 = 0$ |
| $C_4 = -0.14167 \times 10^{-6}$ | $C_4 = +0.16171 \times 10^{-6}$ | $C_4 = -0.22800 \times 10^{-5}$ |
| $C_6 = -0.22352 \times 10^{-10}$ | $C_6 = -0.17475 \times 10^{-9}$ | $C_6 = +0.19485 \times 10^{-9}$ |
| $C_8 = +0.97419 \times 10^{-14}$ | $C_8 = +0.59843 \times 10^{-13}$ | $C_8 = -0.65121 \times 10^{-13}$ |
| $C_{10} = -0.19587 \times 10^{-17}$ | $C_{10} = -0.13108 \times 10^{-16}$ | $C_{10} = +0.12473 \times 10^{-16}$ |

$f_1 = 312.2$
$f_2 = 85.1$
$f_3 = -379.8$
$f_4 = -97.9$ where
  $r_1, r_2, r_3$ . . . are radii of curvature of the lens surfaces numbered in succession from the screen side;
  $d_1, d_2, d_3$ . . . are center-thicknesses and lens-to-lens distances of the first lens (L$_1$), second lens (L$_2$), third lens (L$_3$) and fourth lens (L$_4$);
  $n_1, n_2, n_3$ . . . are the refractive indexes to e-ray at 20° C. of the respective lenses;
  $f_1, f_2, f_3$ and $f_4$ are the focal lengths of the respective lenses;
  f is the focal length of the total system;
  C is apex curvature;
  K is a circular cone constant of the non-spherical surface; and
  $C_2, C_4, C_6, C_8$ and $C_{10}$ are higher order constants of the non-spherical surface.

9. A projection lens according to claim 6 as represented by the following data:

| | | | |
|---|---|---|---|
| f = 103.5 | Aperture ratio: | 1:1.12 | |
| | Magnification of projection: | $-7.952^x$ | |
| | Half angle of view: | 28.4° | |
| $r_1 = 258.591$ | $d_1 = 11.0$ | $n_1 = 1.49380$ | L$_1$ |
| $r_2 = -383.684$ | $d_2 = 90.0$ | | |
| $r_3 = 97.238$ | $d_3 = 22.0$ | $n_2 = 1.62286$ | L$_2$ |
| $r_4 = -114.795$ | $d_4 = 3.0$ | | |
| $r_5 = -88.542$ | $d_5 = 5.0$ | $n_3 = 1.59048$ | L$_3$ |
| $r_6 = -130.879$ | $d_6 = 57.5$ | | |
| $r_7 = -49.159$ | $d_7 = 5.0$ | $n_4 = 1.49380$ | L$_4$ |
| $r_8 = \infty$ | | | |
| $r_9 = \infty$ | $d_8 = 5.0$ | $n_5 = 1.45000$ | S |
| $r_{10} = \infty$ | $d_9 = 0 8.0$ | $n_6 = 1.51872$ | G |

| $r_1$ (L$_1$) | $r_6$ (L$_3$) | $r_7$ (L$_4$) |
|---|---|---|
| K = 1.0 | K = 1.0 | K = 0.0 |
| $C_2 = 0.0$ | $C_2 = 0.0$ | $C_2 = 0.0$ |
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1 = 314.6$
$f_2 = 88.0$
$f_3 = -481.2$
$f_4 = -99.6$ where,
  $r_1, r_2, r_3$ . . . are radii of curvature of the lens surfaces numbered in succession from the screen side;
  $d_1, d_2, d_3$ . . . are center-thicknesses and lens-to-lens distances of the first lens (L$_1$), second lens (L$_2$), third lens (L$_3$) and fourth lens (L$_4$);
  $n_1, n_2, n_3$ . . . are the refractive indexes to e-ray at 20° C. of the respective lenses;
  $f_1, f_2, f_3$ and $f_4$ are the focal lengths of the respective lenses;
  f is the focal length of the total system;
  C is apex curvature;
  K is a circular cone constant of the non-spherical surface; and
  $C_2, C_4, C_6, C_8$ and $C_{10}$ are higher order constants of the non-spherical surface.

10. A projection lens for a video projector which projects an image of a CRT on a screen, said projection lens comprising, in succession from the screen side,
  a first lens of a positive refractive power;
  a second lens of a positive refractive power having a biconvex shape;
  a third lens of a negative refractive power having a concave surface facing to the screen side; and
  a fourth lens of a negative refractive power having a concave surface facing to the screen side,
  further said projection lens being adapted to fulfill the following condition:

$$-3.0 \leq P_1/P_3 \leq -0.8$$

where $P_1$ and $P_3$ are the refractive powers of said first and third lenses.

11. A projection lens according to claim 10, wherein said third lens is of meniscus type.

12. A projection lens according to claim 10, wherein said first, third and fourth lenses are formed of plastics whereas said second lens is formed of glass.

13. A projection lens according to claim 12, wherein said first, third and fourth lenses have non-spherical surfaces and said second lens is a spherical lens.

14. A projection lens according to claim 13, wherein the air-distance between said second and third lenses is smaller than the center thickness of said third lens.

15. A projection lens according to claim 14 as represented by the following data:

| | | |
|---|---|---|
| f = 101.2 | Aperture ratio: | 1:1.10 |
| | Magnification of projection: | $-7.997^x$ |

-continued

| Half angle of view: | | 28.56° | |
|---|---|---|---|
| $r_1 = 143.454$ | $d_1 = 11.0$ | $n_1 = 1.49380$ | $L_1$ |
| $r_2 = -1542.254$ | $d_2 = 68$ | | |
| $r_3 = 116.976$ | $d_3 = 20.0$ | $n_2 = 1.62286$ | $L_2$ |
| $r_4 = 110.914$ | $d_4 = 2.87$ | | |
| $r_5 = -89.375$ | $d_5 = 5.0$ | $n_3 = 1.59501$ | $L_3$ |
| $r_6 = -127.071$ | $d_6 = 58.8$ | | |
| $r_7 = -48.609$ | $d_7 = 5$ | $n_4 = 1.49380$ | $L_4$ |
| $r_8 = \infty$ | | | |
| $r_9 = \infty$ | $d_8 = 5$ | $n_5 = 1.45000$ | S |
| $r_{10} = \infty$ | $d_9 = 8$ | $n_6 = 1.51872$ | G |

| $r_1$ ($L_1$) | $r_6$ ($L_3$) | $r_7$ ($L_4$) |
|---|---|---|
| K = 1.0 | K = 1.0 | K = 0.0 |
| $C_2 = 0$ | $C_2 = 0$ | $C_2 = 0$ |
| $C_4 = -0.25396 \times 10^{-6}$ | $C_4 = -0.15389 \times 10^{-8}$ | $C_4 = -0.16950 \times 10^{-5}$ |
| $C_6 = +0.22757 \times 10^{-12}$ | $C_6 = -0.25521 \times 10^{-10}$ | $C_6 = -0.40698 \times 10^{-9}$ |
| $C_8 = -0.21205 \times 10^{-14}$ | $C_8 = +0.92353 \times 10^{-14}$ | $C_8 = +0.31136 \times 10^{-12}$ |
| $C_{10} = -0.90440 \times 10^{-18}$ | $C_{10} = -0.60222 \times 10^{-17}$ | $C_{10} = -0.46400 \times 10^{-16}$ |

$f_1 = 266.4$
$f_2 = 94.6$
$f_3 = -532.7$
$f_4 = -98.438$ where, $r_1$, $r_2$, $r_3$ ... are radii of curvature of the lens surfaces numbered in succession from the screen side;

$d_1$, $d_2$, $d_3$ ... are center-thicknesses and lens-to-lens distances of the first lens ($L_1$), second lens ($L_2$), third lens ($L_3$) and fourth lens ($L_4$);

$n_1$, $n_2$, $n_3$ ... are the refractive indexes to e-ray at 20° C. of the respective lenses;

$f_1$, $f_2$, $f_3$ and $f_4$ are the focal lengths of the respective lenses;

f is the focal length of the total system;

C is apex curvature;

K is a circular cone constant of the non-spherical surfaces; and $C_2$, $C_4$, $C_6$, $C_8$ and $C_{10}$ are higher order constants of the non-spherical surface.

16. A projection lens according to claim 14 as represented by the following data:

| f = 103.9 | Aperture ratio: | 1:1.11 | |
|---|---|---|---|
| Magnification of projection: | | $-7.932^x$ | |
| Half angle of view: | | 27.1° | |
| $r_1 = 223.029$ | $d_1 = 11.0$ | $n_1 = 1.49380$ | $L_1$ |
| $r_2 = -491.036$ | $d_2 = 90.0$ | | |
| $r_3 = 93.718$ | $d_3 = 24.0$ | $n_2 = 1.62286$ | $L_2$ |
| $r_4 = -110.115$ | $d_4 = 3.0$ | | |
| $r_5 = -87.097$ | $d_5 = 5.0$ | $n_3 = 1.59501$ | $L_3$ |
| $r_6 = -144.756$ | $d_6 = 56.0$ | | |
| $r_7 = -48.366$ | $d_7 = 5.0$ | $n_4 = 1.49380$ | $L_4$ |
| $r_8 = \infty$ | | | |
| $r_9 = \infty$ | $d_8 = 5.0$ | $n_5 = 1.45000$ | S |
| $r_{10} = \infty$ | $d_9 = 8.0$ | $n_6 = 1.51872$ | G |

| $r_1$ ($L_1$) | $r_6$ ($L_3$) | $r_7$ ($L_4$) |
|---|---|---|
| K = 1.0 | K = 1.0 | K = 0.0 |
| $C_2 = 0$ | $C_2 = 0$ | $C_2 = 0$ |
| $C_4 = -0.14167 \times 10^{-6}$ | $C_4 = +0.16171 \times 10^{-6}$ | $C_4 = -0.22800 \times 10^{-5}$ |
| $C_6 = -0.22352 \times 10^{-10}$ | $C_6 = -0.17475 \times 10^{-9}$ | $C_6 = +0.19485 \times 10^{-9}$ |
| $C_8 = +0.97419 \times 10^{-14}$ | $C_8 = +0.59843 \times 10^{-13}$ | $C_8 = -0.65121 \times 10^{-13}$ |
| $C_{10} = -0.19587 \times 10^{-17}$ | $C_{10} = -0.13108 \times 10^{-16}$ | $C_{10} = +0.12473 \times 10^{-16}$ |

$f_1 = 312.2$
$f_2 = 85.1$
$f_3 = -379.8$
$f_4 = -97.9$ where $r_1$, $r_2$, $r_3$ ... are radii of curvature of the lens surfaces numbered in succession from the screen side;

$d_1$, $d_2$, $d_3$ ... are center-thicknesses and lens-to-lens distances of the first lens ($L_1$), second lens ($L_2$), third lens ($L_3$) and fourth lens ($L_4$);

$n_1$, $n_2$, $n_3$ ... are the refractive indexes to e-ray at 20° C. of the respective lenses;

$f_1$, $f_2$, $f_3$ and $f_4$ are the focal lengths of the respective lenses;

f is the focal length of the total system;

C is apex curvature;

K is a circular cone constant of the non-spherical surface; and $C_2$, $C_4$, $C_6$, $C_8$ and $C_{10}$ are higher order constants of the non-spherical surface.

17. A projection lens according to claim 14, as represented by the following data:

| f = 103.5 | Aperture ratio: | 1:1.12 | |
|---|---|---|---|
| Magnification of projection: | | $-7.952^x$ | |
| Half angle of view: | | 28.4° | |
| $r_1 = 258.591$ | $d_1 = 11.0$ | $n_1 = 1.49380$ | $L_1$ |
| $r_2 = -383.684$ | $d_2 = 90.0$ | | |
| $r_3 = 97.238$ | $d_3 = 22.0$ | $n_2 = 1.62286$ | $L_2$ |
| $r_4 = -114.795$ | $d_4 = 3.0$ | | |
| $r_5 = -88.542$ | $d_5 = 5.0$ | $n_3 = 1.59048$ | $L_3$ |
| $r_6 = -130.879$ | $d_6 = 57.5$ | | |
| $r_7 = -49.159$ | $d_7 = 5.0$ | $n_4 = 1.49380$ | $L_4$ |
| $r_8 = \infty$ | | | |
| $r_9 = \infty$ | $d_8 = 5.0$ | $n_5 = 1.45000$ | S |
| $r_{10} = \infty$ | $d_9 = 0\,8.0$ | $n_6 = 1.51872$ | G |

| $r_1$ ($L_1$) | $r_6$ ($L_3$) | $r_7$ ($L_4$) |
|---|---|---|
| K = 1.0 | K = 1.0 | K = 0.0 |
| $C_2 = 0.0$ | $C_2 = 0.0$ | $C_2 = 0.0$ |

-continued

| $r_1$ (L$_1$) | $r_6$ (L$_3$) | $r_7$ (L$_4$) |
|---|---|---|
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1 = 314.6$
$f_2 = 88.0$
$f_3 = -481.2$
$f_4 = -99.6$ where,
$r_1, r_2, r_3 \ldots$ are radii of curvature of the lens surfaces numbered in succession from the screen side;
$d_1, d_2, d_3 \ldots$ are center-thicknesses and lens-to-lens distances of the first lens (L$_1$), second lens (L$_2$), third lens (L$_3$) and fourth lens (L$_4$);
$n_1, n_2, n_3 \ldots$ are the refractive indexes to e-ray at 20° C. of the respective lenses;
$f_1, f_2, f_3$ and $f_4$ are the focal lengths of the respective lenses;
f is the focal length of the totl system;
C is apex curvature;
K is a circular cone constant of the non-spherical surface; and
$C_2, C_4, C_6, C_8$ and $C_{10}$ are higher order constants of the non-spherical surface.

18. A projection lens for a video projector which projects an image of a CRT on a screen, said projection lens comprising, in succession from the screen side, a first lens of a positive refractive power;
a second lens of a positive refractive power having a biconvex shape;
a third lens of a negative refractive power having a concave surface facing to the screen side; and
a fourth lens of a negative refractive power having a concave surface facing to the screen side,
further said projection lens being adapted to fulfill the following condition:

$$|r_4| > |r_5|$$

where
$r_4$ is the radius of curvatuve of the CRT side lens surface of said second lens, and
$r_5$ is the radius of curvature of the screen side lens surface of said third lens.

19. A projection lens according to claim 18, wherein said third lens is of meniscus type.

20. A projection lens according to claim 18, wherein said first, third and fourth lenses are formed of plastics whereas said second lens is formed of glass.

21. A projection lens according to claim 20, wherein said first, third and fourth lenses have non-spherical surfaces and said second lens is a spherical lens.

22. A projection lens according to claim 21, wherein the air-distance between said second and third lenses is smaller than the center thickness of said third lens.

23. A projection lens according to claim 22 as represented by the following data:

| f = 101.2 | Aperture ratio: | 1:1.10 | |
|---|---|---|---|
| Magnification of projection: | | $-7.997^x$ | |
| Half angle of view: | | 28.56° | |
| $r_1 = 143.454$ | $d_1 = 11.0$ | $n_1 = 1.49380$ | L$_1$ |
| $r_2 = -1542.254$ | $d_2 = 68$ | | |
| $r_3 = 116.976$ | $d_3 = 20.0$ | $n_2 = 1.62286$ | L$_2$ |
| $r_4 = 110.914$ | $d_4 = 2.87$ | | |
| $r_5 = -89.375$ | $d_5 = 5.0$ | $n_3 = 1.59501$ | L$_3$ |
| $r_6 = -127.071$ | $d_6 = 58.8$ | | |
| $r_7 = -48.609$ | $d_7 = 5$ | $n_4 = 1.49380$ | L$_4$ |
| $r_8 = \infty$ | | | |
| $r_9 = \infty$ | $d_8 = 5$ | $n_5 = 1.45000$ | S |
| $r_{10} = \infty$ | $d_9 = 8$ | $n_6 = 1.51872$ | G |

| $r_1$ (L$_1$) | $r_6$ (L$_3$) | $r_7$ (L$_4$) |
|---|---|---|
| K = 1.0 | K = 1.0 | K = 0.0 |
| $C_2 = 0$ | $C_2 = 0$ | $C_2 = 0$ |
| $C_4 = -0.25396 \times 10^{-6}$ | $C_4 = -0.15389 \times 10^{-8}$ | $C_4 = -0.16950 \times 10^{-5}$ |
| $C_6 = +0.22757 \times 10^{-12}$ | $C_6 = -0.25521 \times 10^{-10}$ | $C_6 = -0.40698 \times 10^{-9}$ |
| $C_8 = -0.21205 \times 10^{-14}$ | $C_8 = +0.92353 \times 10^{-14}$ | $C_8 = +0.31136 \times 10^{-12}$ |
| $C_{10} = -0.90440 \times 10^{-18}$ | $C_{10} = -0.60222 \times 10^{-17}$ | $C_{10} = -0.46400 \times 10^{-16}$ |

$f_1 = 266.4$
$f_2 = 94.6$
$f_3 = -532.7$
$f_4 = -98.438$ where,
$r_1, r_2, r_3 \ldots$ are radii of curvature of the lens surfaces numbered in succession from the screen side;
$d_1, d_2, d_3 \ldots$ are center-thicknesses and lens-to-lens distances of the first lens (L$_1$), second lens (L$_2$), third lens (L$_3$) and fourth lens (L$_4$);
$n_1, n_2, n_3 \ldots$ are the refractive indexes to e-ray at 20° C. of the respective lenses;
$f_1, f_2, f_3$ and $f_4$ are the focal lengths of the respective lenses;
f is the focal length of the total system;
C is apex curvature;
K is a circular cone constant of the non-spherical surfaces; and
$C_2, C_4, C_6, C_8$ and $C_{10}$ are higher order constants of the non-spherical surface.

24. A projection lens according to claim 22 as represented by the following data:

| f = 103.9 | Aperture ratio: | 1:1.11 | |
|---|---|---|---|
| Magnification of projection: | | $-7.932^x$ | |
| Half angle of view: | | 27.1° | |
| $r_1 = 223.029$ | $d_1 = 11.0$ | $n_1 = 1.49380$ | L$_1$ |
| $r_2 = -491.036$ | $d_2 = 90.0$ | | |
| $r_3 = 93.718$ | $d_3 = 24.0$ | $n_2 = 1.62286$ | L$_2$ |
| $r_4 = -110.115$ | $d_4 = 3.0$ | | |
| $r_5 = -87.097$ | $d_5 = 5.0$ | $n_3 = 1.59501$ | L$_3$ |

-continued

| | | | |
|---|---|---|---|
| $r_6 = -144.756$ | $d_6 = 56.0$ | | |
| $r_7 = -48.366$ | $d_7 = 5.0$ | $n_4 = 1.49380$ | $L_4$ |
| $r_8 = \infty$ | | | |
| $r_9 = \infty$ | $d_8 = 5.0$ | $n_5 = 1.45000$ | S |
| $r_{10} = \infty$ | $d_9 = 8.0$ | $n_6 = 1.51872$ | G |

| $r_1$ ($L_1$) | $r_6$ ($L_3$) | $r_7$ ($L_4$) |
|---|---|---|
| K = 1.0 | K = 1.0 | K = 0.0 |
| $C_2 = 0$ | $C_2 = 0$ | $C_2 = 0$ |
| $C_4 = -0.14167 \times 10^{-6}$ | $C_4 = +0.16171 \times 10^{-6}$ | $C_4 = -0.22800 \times 10^{-5}$ |
| $C_6 = -0.22352 \times 10^{-10}$ | $C_6 = -0.17475 \times 10^{-9}$ | $C_6 = +0.19485 \times 10^{-9}$ |
| $C_8 = +0.97419 \times 10^{-14}$ | $C_8 = +0.59843 \times 10^{-13}$ | $C_8 = -0.65121 \times 10^{-13}$ |
| $C_{10} = -0.19587 \times 10^{-17}$ | $C_{10} = -0.13108 \times 10^{-16}$ | $C_{10} = +0.12473 \times 10^{-16}$ |

$f_1 = 312.2$
$f_2 = 85.1$
$f_3 = -379.8$
$f_4 = -97.9$ where
$r_1, r_2, r_3 \ldots$ are radii of curvature of the lens surfaces numbered in succession from the screen side;
$d_1, d_2, d_3 \ldots$ are center-thicknesses and lens-to-lens distances of the first lens ($L_1$), second lens ($L_2$), third lens ($L_3$) and fourth lens ($L_4$);
$n_1, n_2, n_3 \ldots$ are the refractive indexes to e-ray at 20° C. of the respective lenses;
$f_1, f_2, f_3$ and $f_4$ are the focal lengths of the respective lenses;
f is the focal length of the total system;
C is apex curvature;
K is a circular cone constant of the non-spherical surface; and
$C_2, C_4, C_6, C_8$ and $C_{10}$ are higher order constants of the non-spherical surface.

25. A projection lens according to claim 22 as represented by the following data:

f = 103.5   Aperture ratio:   1:1.12

-continued

| | | | |
|---|---|---|---|
| Magnification of projection: | $-7.952^x$ | | |
| Half angle of view: | 28.4° | | |
| $r_1 = 258.591$ | $d_1 = 11.0$ | $n_1 = 1.49380$ | $L_1$ |
| $r_2 = -383.684$ | $d_2 = 90.0$ | | |
| $r_3 = 97.238$ | $d_3 = 22.0$ | $n_2 = 1.62286$ | $L_2$ |
| $r_4 = -114.795$ | $d_4 = 3.0$ | | |
| $r_5 = -88.542$ | $d_5 = 5.0$ | $n_3 = 1.59048$ | $L_3$ |
| $r_6 = -130.879$ | $d_6 = 57.5$ | | |
| $r_7 = -49.159$ | $d_7 = 5.0$ | $n_4 = 1.49380$ | $L_4$ |
| $r_8 = \infty$ | | | |
| $r_9 = \infty$ | $d_8 = 5.0$ | $n_5 = 1.45000$ | S |
| $r_{10} = \infty$ | $d_9 = 0 8.0$ | $n_6 = 1.51872$ | G |

| $r_1$ ($L_1$) | $r_6$ ($L_3$) | $r_7$ ($L_4$) |
|---|---|---|
| K = 1.0 | K = 1.0 | K = 0.0 |
| $C_2 = 0.0$ | $C_2 = 0.0$ | $C_2 = 0.0$ |
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1 = 314.6$
$f_2 = 88.0$
$f_3 = -481.2$
$f_4 = -99.6$ where,
$r_1, r_2, r_3 \ldots$ are radii of curvature of the lens surfaces numbered in succession from the screen side;
$d_1, d_2, d_3 \ldots$ are center-thicknesses and lens-to-lens distances of the first lens ($L_1$), second lens ($L_2$), third lens ($L_3$) and fourth lens ($L_4$);
$n_1, n_2, n_3 \ldots$ are the refractive indexes to e-ray at 20° C. of the respective lenses;
$f_1, f_2, f_3$ and $f_4$ are the focal lengths of the respective lenses;
f is the focal length of the total system;
C is apex curvature;
K is a circular cone constant of the non-spherical surface; and
$C_2, C_4, C_6, C_8$ and $C_{10}$ are higher order constants of the non-spherical surface.

* * * * *